United States Patent [19]

Powondra

[11] 3,999,786
[45] Dec. 28, 1976

[54] JOINT BETWEEN TWO MEMBERS

[76] Inventor: Franz Powondra, 4 Beethovengasse, A-1090 Vienna, Austria

[22] Filed: Sept. 16, 1974

[21] Appl. No.: 506,046

[30] Foreign Application Priority Data

Sept. 27, 1973 Austria ............................ 8322/73

[52] U.S. Cl. ............................. 285/297; 403/268
[51] Int. Cl.² ....................................... F16L 27/12
[58] Field of Search ... 285/305, 294, 297, DIG. 20, 285/276, 295; 403/268

[56] References Cited

UNITED STATES PATENTS

| 672,732 | 4/1901 | Conner | 285/276 X |
|---|---|---|---|
| 2,409,865 | 10/1946 | Jewell | 285/294 X |
| 2,876,154 | 3/1959 | Usab | 285/DIG. 20 |
| 3,148,922 | 9/1964 | Roessler | 285/276 X |
| 3,333,046 | 7/1967 | Margis | 285/294 X |
| 3,507,532 | 4/1970 | Gross et al. | 285/305 X |

FOREIGN PATENTS OR APPLICATIONS

| 1,476,758 | 3/1967 | France | 285/295 |
| 2,588 | 1910 | United Kingdom | 285/290 |

*Primary Examiner*—Dave W. Arola
*Attorney, Agent, or Firm*—Imirie, Smiley & Linn

[57] ABSTRACT

To form a joint between members, a projection of at least one member is introduced into a bore of another member and is held therein by particulate material, which has been filled into the space provided between the interextending portions of the members to be joined and has entered recesses provided in the mutually confronting surfaces of the interextending portions.

7 Claims, 8 Drawing Figures

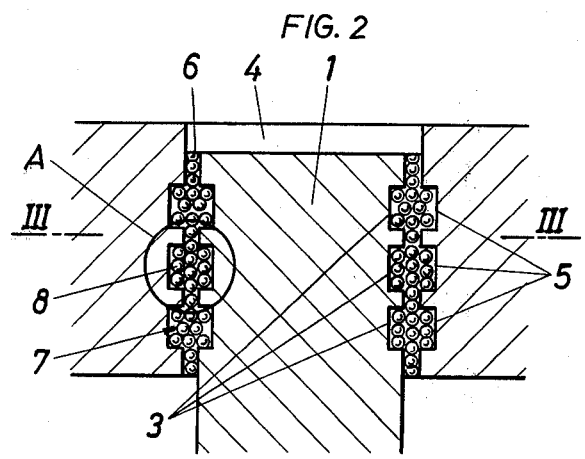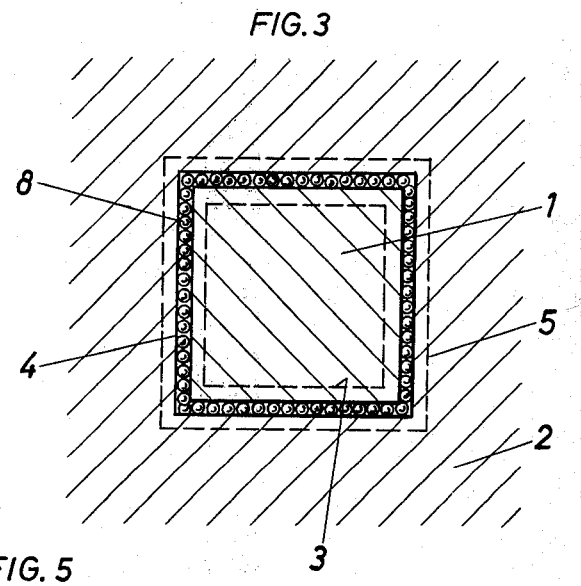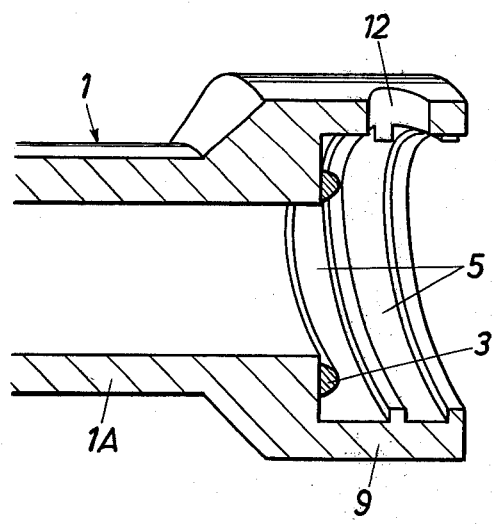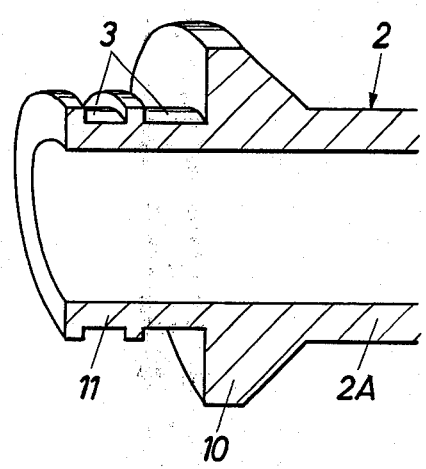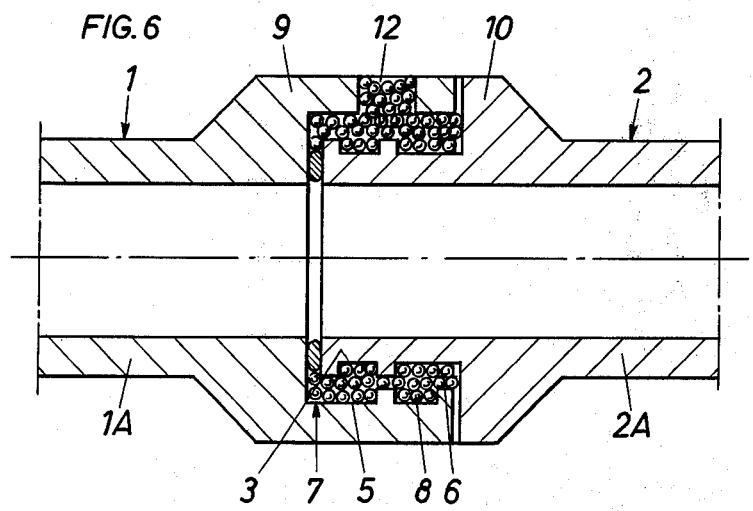

JOINT BETWEEN TWO MEMBERS

SUMMARY OF INVENTION

To form a joint between members, portions thereof are caused to extend one in the other and a space provided between said portions is filled with particulate material, which enters recesses formed in the surfaces of the two portions so that the same are forcibly locked to each other.

This invention relates to a joint between members, one of which has an opening whereas the other has a portion which is adapted to be inserted into said opening and which is retained in said opening by a mass of material which has been introduced between said portion and the surface that defines the opening.

Joints of this kind have been disclosed as socketed pipe joints, in which mutually registering grooves in the confronting surfaces of the socket of one pipe and in the outside peripheral surface of the other pipe are filled with a pourable sealing compound, which is inserted from the outside through a bore formed in the socket and is subsequently allowed to harden. It has been proposed to use a pourable sealing compound consisting of a resin to which a metal powder has been added, e.g., an epoxy resin to which aluminum dust has been added. The use of such joint was restricted to the above-mentioned field because the sealing compound cannot transmit sufficiently strong shear forces in members which are to be subjected to high axial compressive stresses.

Known elements for joining reinforcing rods for reinforced concrete comprise a metallic filler, which has been produced by aluminothermic welding. Such welding requires special equipment and may be used only in cases in which high temperatures will not adversely affect the members to be joined.

It is an object of the present invention to provide means which enable any desired members to be connected by a joint as defined hereinbefore.

It is another object of the invention to enable the use of said joint for connecting any desired number of members.

To accomplish that object, it is a feature of the invention to introduce a mass of material between the interextending portions of the members to be joined so that one member is anchored in the other by said mass.

Further details of the invention will be explained more fully with reference to the drawings, which show by way of example several embodiments of the members to be joined.

BRIEF DESCRIPTION OF THE DRAWINGS

FIG. 2 is a transverse sectional view showing the assembled joint.

FIG. 3 is a sectional view taken on line III—III in FIG. 2.

FIG. 5 is a perspective sectional view showing two tubular members to be joined, and FIG. 6 is a longitudinal axial sectional view showing the assembled joint.

DETAILED DESCRIPTION OF THE INVENTION

Figure 1:
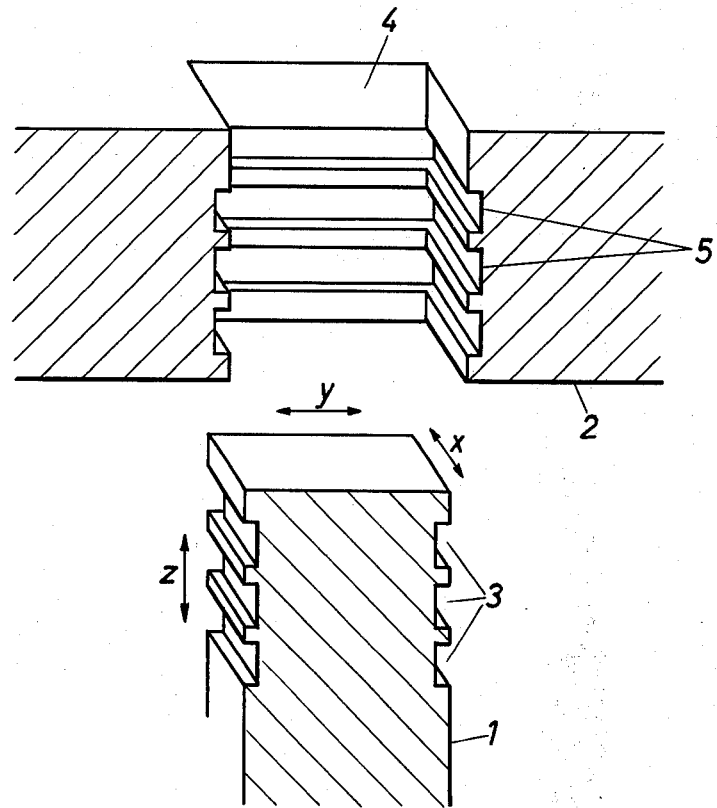
FIG. 1 is a perspective sectional view showing the anchoring of a rod-shaped member in a plate before the two members have been moved to extend one in the other.

The members to be joined are generally designated 1 and 2. In the joint shown in FIGS. 1 to 3, the member 1 is a rod which is square in cross-section and the member 2 is a plate into which the rod 1 is to be inserted. For this purpose the rod 1 is provided with spaced apart peripheral grooves 3 at that end which is to be inserted into the plate 2, and the plate 2 has an opening 4 which has dimensions that are slightly larger than the dimensions of the cross-section of the rod so that the rod when inserted into the opening 4 can be adjusted in all directions and can thus be positioned relative to the plate as desired. Grooves 5 are also formed in the surface which defines the opening 4. In the present case, the grooves 5 have the same form as the grooves 3 and are so arranged that when the rod 1 is inserted each groove 5 in the surface which defines the opening 4 faces a groove 3 in the rod 1. At least in part of the periphery of that portion of the rod 1 which is disposed in opening 4 of the plate 2, a clearance 6 remains between said rod and the surface which defines the opening 4 and this clearance extends throughout the length in which the members interextend, i.e., in the present case throughout the length of that portion of the rod 1 which is disposed in the opening 4. This clearance may be selected within limits and permits of a relative dislocation of the members to be joined in the direction of all three coordinate axes. For instance, a dislocation of 6 millimeters (±3 millimeters) in the direction of x-axis, a dislocation of 8 millimeters (±4 millimeters) in the direction of the y-axis, and a dislocation of 12 millimeters (±6 millimeters) in the direction of the z-axis may be enabled. The clearance may be used also to compensate the inaccuracies which are due to the manufacture of the components.

To join the members 1, 2, the clearance 6 between the members as well as the grooves 3, 5 are filled with a filler 7, which consists of a particulate material and, if desired, a pourable sealing compound, such as plastics material, cement grout, etc. These components may be introduced individually or as a mixture by pouring, sucking, injecting, vibrating, blowing and the like operations. As will be described more fully in connection with another embodiment, this is enabled by a duct, which is formed in the wall that defines the opening 4 of the member 2. That duct is not shown and leads to the outside and serves for the introduction of the filler material and of any pourable sealing compound. The clearance 6 between the interextending portions of the members must be designed so that the material which is introduced can spread under gravity or under pressure to such an extent that the material fills the clearance 6 as well as the grooves 3 and 5. The pourable sealing compound is introduced together with the granular material or after the introduction of the latter and fills the interstices between the individual particles and between the latter and the surfaces of the two members to be joined.

Figure 4A:
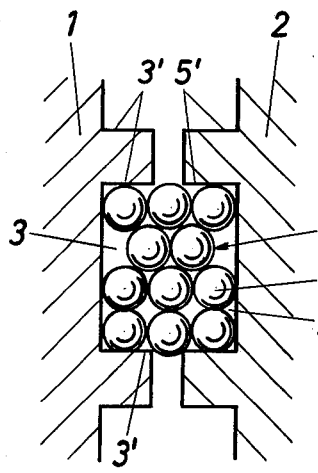
FIGS. 4 and 4A are enlarged views showing the portion designated A in FIG. 2 with the filling particles arranged in different patterns.
Figure 4:
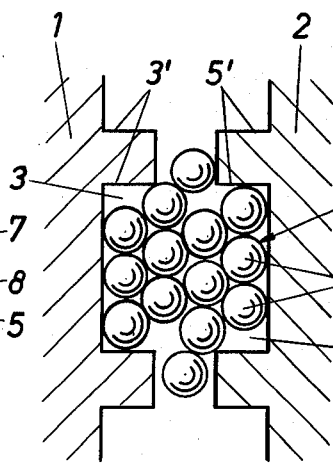

FIGS. 4 and 4A illustrate two different designs of the portion designated A in FIG. 2. Particles 8 are only shown, which are disposed in a pass between grooves 3, 5.

Depending on the depth in which the two members 1, 2 interextend, the grooves 3, 5 may be relatively staggered.

Figure 4B:
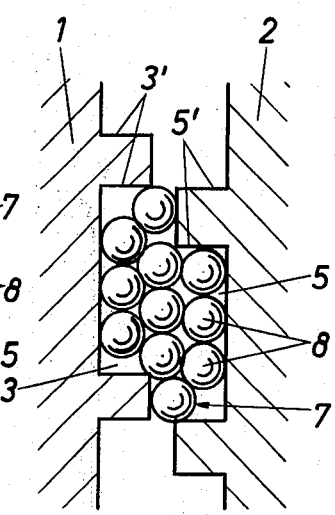
FIG. 4B shows the portion A with offset grooves.

Such an embodiment is shown in FIG. 4B. The particles filling the space between the members to be joined may form a dense aggregate, which is more or less ordered, depending on the shape of the members, and by which the members to be joined can be forcibly locked to each other.

The particulate material may consist, e.g., of metal, plastics material or stone, e.g., in the form of balls. In addition, a filler consisting, e.g., of steel powder, rock powder, or a fibrous reinforcement, e.g., if steel, glass, silk, asbestos or the like may be provided in the hardenable material to ensure a high modulus of elasticity, a high stability of volume, a high compressive strength, a low shrinkage or desirable elongation properties or to increase the inherent strength of the filled material.

To ensure that the particulate material exerts a maximum or most suitable locking force, the designer may properly select, inter alia, the shape, size, strength properties, material and surface quality of the particles of the particulate material and the shape of the elevations and recesses of the members which are to be joined and between which the particulate material is introduced, e.g., the inclination of the side faces 3' and 5' of the grooves 3 and 5. These grooves are annular in the present case but may also be spiral or helical.

The filling or the enriching with the solid component may be repeated until the joint has been filled with a mixture having the desired composition.

FIGS. 5 and 6 illustrate a joint between two pipe sections 1A, 2A, which serve to conduct a liquid or gaseous fluid and represent members differing from members 1, 2. That joint should not only transmit force but should also be tight. One pipe section 1A is provided with a socket 9 and the other pipe section is provided with a collar 10, which closes said socket when the pipe sections 1A, 2A are assembled. In the joint between the members 1A, 2A, the socket 9 is provided on the inside with the above-described grooves 9 and the pipe section 2a is provided with the above-described grooves 3 on that end portion 11 of the pipe section 2A which adjoins the collar 10 and is disposed in the socket 9. When the pipe sections 1A, 2A are assembled, the clearance 6 is provided between the socket 9 and the pipe end portion 11. To introduce the filler into that clearance, the socket 9 has at least one radial opening 12, which may open into a duct, which extends preferably over the length of the overlap and serves to distribute the filler in the clearance between the two members to be joined. A sealing ring 13 may be provided to seal the joint between the pipe end portion 11 and the socket 9. The material of the filler 7 may be selected so that the filler forms a seal instead of or in addition to the sealing ring 13, and the filler may also constitute an insulator, if desired.

The teachings embodied in the illustrative embodiments described hereinbefore may be embodied in any joint between two or more interextending members, such as two plate-like members. The latter may be connected, e.g., by means of pins provided on one member and bores provided in the other member, by tongue-and-groove joints or the like, in such a manner that the space between the interextending portions of the two members is filled according to the invention. Furthermore, an intermediate member may be provided, which is similarly joined to two or more members to be connected.

What is claimed is:

1. A joint between two members, said joint comprising an opening in a first member and a portion of a second member, which portion extends in said opening, said opening and said portion having confronting surfaces which define a clearance to allow relative positioning of said first and second members, said clearance communicating with recesses formed in both said surfaces, said clearance and said recesses being filled with a plurality of particles in physical contact with each other and with said confronting surfaces and said recesses to forcibly lock said members to each other, said recesses in said surface defining said opening and in said surface of the portion which extends in said opening consisting of peripheral grooves which extend transversely to the direction in which the second member has been inserted into the first, said plurality of particles having interstices which are filled with a filler of a hardenable, nonmetallic material.

2. A joint as set forth in claim 1, wherein said filler includes a powder which increases the strength of the filler.

3. A joint as set forth in claim 1, wherein said filler includes a metal powder.

4. A joint as set forth in claim 3, wherein particles are made of metal.

5. A joint as set forth in claim 4, wherein said particles consist of steel balls.

6. A joint as set forth in claim 1, wherein said clearance extends throughout the length of that portion of said second member which extends in said first member.

7. A joint as set forth in claim 1, wherein an opening for introducing said particles is provided in said first member adjacent to said clearance.

* * * * *